Patented Nov. 28, 1933

1,936,829

UNITED STATES PATENT OFFICE 1,936,829

PROCESS OF MAKING NICKEL SULPHATE

Harry P. Corson, Lakewood, Ohio, assignor to The Grasselli Chemical Company, Cleveland, Ohio, a corporatioin of Delaware No Drawing. Application November 8, 1932
Serial No. 641,757

6 Claims. (Cl. 23—117)

The present invention relates to a novel process of making nickel sulphate and consists in contacting metallic bodies containing nickel, such as commercial nickel or its alloys, particularly Monel metal, with dilute sulphuric acid at elevated temperatures and in the presence of oxygen or an oxygen containing gas and it is particularly characterized by the employment in this operation of a gas which contains oxygen at an absolute pressure greater than that corresponding to the partial pressure of oxygen in atmospheric air at the temperature of the reaction mixture.

Nickel stands below hydrogen in the series of electromotive forces of the metals and it is therefore attacked by acids. This attack is, however, too slow to make it commercially practical to produce nickel sulphate by dissolving compact bodies of metallic nickel in sulphuric acid. It was, for instance, found that metallic nickel dissolved in dilute sulphuric acid (for instance a 10% acid) at the rate of 426 milligrams per square decimeter of surface per 24 hours at 90° C.

Monel metal, a well known nickel copper alloy of a composition from 60-70% Ni, 25-35% Cu, 1-3% Fe with smaller amounts of other substances resists attack by acids better than pure nickel. It has, due to this resistivity, found numerous technical applications. Scrap Monel metal is available from fabricating operations of this alloy but while scrap nickel can be used as such as an ingredient in making alloy steel, Monel scrap is not available for this purpose because of its large copper content, and scrap Monel has very few uses; as a matter of fact, I am not aware that it has ever been used in this country to recover its nickel content by chemical methods.

Some of the technical nickel sulphate is produced as a by-product in the electrolytic refining of copper where nickel sulphate accumulates as an impurity in the cell liquors. Nickel sulphate can also be made by the electrolytic attack of metallic nickel in sulphuric acid. Some nickel sulphate is made from a special, finely divided form of nickel known as reduced nickel which is obtained by reduction of nickel oxide. It has also been proposed to dissolve nickel in a mixture of nitric acid and sulphuric acids whereby, after elimination of the nitric acid, nickel sulphate is obtained. Scrap nickel, however, or other compact forms of nickel or its alloys, have heretofore not been available for the manufacture of nickel sulphate from pure sulphuric acid.

I have found that when oxygen is present in the reaction mixture of nickel and sulphuric acid the pressure of said oxygen has a determining influence upon the rate of solution of the nickel in the acid and that increasing said pressure greatly accelerates this rate.

In atmospheric air the absolute pressure of oxygen is only about 160 m/m, which is its partial pressure in the gas mixture. To increase this pressure I can increase the percentage of oxygen in the air, going as far as using pure oxygen. Increasing the absolute pressure of atmospheric air does not change the relative pressures of oxygen and the inert constituents of air, but increases the absolute pressure of the oxygen.

Both these methods of increasing the absolute pressure of oxygen can be used in connection with my invention of dissolving nickel, or Monel metal in sulphuric acid in contact with oxygen. The use of atmospheric air under super-atmospheric pressure is, of course, the more economical one of the two methods.

In dissolving Monel metal in sulphuric acid according to my invention, I found that besides the nickel, also the other metallic constituents of the alloy are dissolved and I obtain a mixture of the sulphates which are then separated by well known methods.

In operating my novel process in its preferred form I put the metal in the form of scrap or in other compact form into dilute sulphuric acid contained in an acid resisting vessel, such as lead lined steel, capable of resisting pressures up to about 100 lbs. and provided with inlets for air, steam, etc. a controllable pressure outlet and other standard measuring devices, such as pressure gauges, thermometer, etc.

The vessel contains dilute sulphuric acid in an amount and concentration of say 20% so as to obtain a highly concentrated or saturated and neutral solution of the metal sulphate, and I preferably use an amount of metal scrap at least sufficient to neutralize all the acid. I also can use as the diluent for the sulphuric acid the mother liquor as obtained from the crystallization of the sulphates obtained in a preceding cycle of operations.

I now introduce live steam and compressed air at controlled rates into the reaction vessel and adjust the vent valve to maintain the pressure in the vessel greater than atmospheric, for instance at from 30 to 75 lbs. gauge or more. The temperature in the vessel is maintained above room temperature. This increase of temperature is obtained by the live steam introduced or in any other desired and convenient manner.

The accelerated reaction between the acid and the nickel or nickel alloy proceeds even at 75° C. under increased pressure, but is preferably carried out somewhat higher. 90° C. was found high enough to permit satisfactory operation but I prefer to operate under pressure at temperatures above 100° C. and can go as high as the boiling point of the mixture at the pressure maintained.

The nickel or nickel alloy readily dissolves and when the solution has become substantially neutral it is discharged. When the amount and strength of acid have been correctly chosen a hot, saturated solution of the metals is produced which, on cooling, separates the metal sulphates, these are then purified or separated in well known manners, the mother liquor becoming available as a diluent for subsequent cycles.

Monel metal being the preferred raw material for obtaining nickel sulphate according to my novel process, I shall in the following describe a specific embodiment of my invention in connection with this nickel containing metal.

I used a homogeneously lead lined, upright steel cylinder with the necessary attachments which was filled with Monel metal scrap in the form of sheet clippings, etc. Into this I charged 80 lbs. of a mother liquor from a preceding cycle which had a density of approximately 38° Bé. at room temperature. To this I added 35 lbs. 66° Bé. sulphuric acid and 10 lbs. of water, thereby filling the apparatus to about ⅔ of its capacity. Steam and compressed air were then introduced over a period of 2½ hours, maintaining an average gauge pressure in the vessel of 68 lb. per sq. in. and a temperature of 140–150° C. The average air flow into the vessel was slightly over 5 cu. ft. of free air per minute with a total air consumption of 785 cu. ft. of free air.

This produced 165 lbs. of a substantially neutral solution of the sulphates of nickel, copper and other metals contained in the Monel metal scrap. The solution had a density of 50° Bé. at 90° C. and had dissolved 18 lbs. Monel metal.

The nickel and copper content of liquors so obtained can be recovered in various manners.

One procedure is to crystallize fractionally the nickel and copper sulphates as is well known in the art of electrolytically refining copper; other methods comprise fractionally precipitating with lime and copper and iron as hydroxides or precipitating the copper with metallic nickel.

In using scrap nickel instead of Monel metal as above, a similar acceleration in the rate of attack was obtained under analogous conditions. Similarly, in using a gas stream of a greater oxygen concentration than in atmospheric air an acceleration of the attack of Monel metal or metallic nickel was obtained comparative to the attack with atmospheric air at ordinary pressure and at the same temperature.

I claim:

1. In a process of making nickel sulphate by the action of hot, dilute sulphuric acid upon a nickel containing metallic body, the step of introducing into the reaction mixture a gas containing free oxygen in which the pressure of the free oxygen is greater than the partial pressure of oxygen in atmospheric air at the temperature of the reaction mixture.

2. In a process of making nickel sulphate by the action of hot, dilute sulphuric acid upon a nickel containing metallic body, the step of introducing into the reaction mixture a gas containing more free oxygen than is contained in atmospheric air and maintaining the reaction mixture at a pressure greater than atmospheric.

3. In a process of making nickel sulphate by the action of hot, dilute sulphuric acid upon a nickel containing metallic body, the step of maintaining the reaction mixture under a pressure greater than atmospheric and introducing compressed air into said reaction mixture.

4. In a process of making nickel sulphate, the steps of contacting a nickel-copper-iron alloy with hot, dilute sulphuric acid and introducing compressed air into the reaction mixture while maintaining it at a pressure greater than atmospheric.

5. In a process of making nickel sulphate, the steps of contacting a nickel-copper-iron alloy with hot, dilute sulphuric acid, introducing compressed air and steam into the reaction mixture while maintaining it at a pressure greater than atmospheric and at a temperature above 100° C.

6. In a process of making nickel sulphate, the steps of contacting a nickel-copper-iron alloy with hot, dilute sulphuric acid, introducing compressed air and steam into the reaction mixture while maintaining it under a pressure greater than 30 lb. gauge and at a temperature above 100° C.

HARRY P. CORSON.